United States Patent
Ryoo

(10) Patent No.: US 7,948,300 B2
(45) Date of Patent: May 24, 2011

(54) NEGATIVE SUPPLY VOLTAGE GENERATING CIRCUIT AND SEMICONDUCTOR INTEGRATED CIRCUIT HAVING THE SAME

(75) Inventor: Ji-Yeoul Ryoo, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/539,653

(22) Filed: Aug. 12, 2009

(65) Prior Publication Data

US 2010/0039170 A1 Feb. 18, 2010

(30) Foreign Application Priority Data

Aug. 12, 2008 (KR) .................. 10-2008-0078894

(51) Int. Cl.
*G05F 3/16* (2006.01)
*H02M 3/16* (2006.01)
(52) U.S. Cl. ........................ 327/536; 363/60; 365/226
(58) Field of Classification Search .................. None
See application file for complete search history.

(56) References Cited

U.S. PATENT DOCUMENTS

| 5,394,365 | A | * | 2/1995 | Tsukikawa | 365/189.09 |
| 5,841,703 | A | * | 11/1998 | Wojciechowski | 365/189.09 |
| 6,838,922 | B2 | * | 1/2005 | Melcher | 327/291 |
| 7,760,010 | B2 | * | 7/2010 | Gebara et al. | 327/536 |
| 2007/0096796 | A1 | * | 5/2007 | Firmansyah et al. | 327/536 |

FOREIGN PATENT DOCUMENTS

| KR | 2004229434 | 8/2004 |
| KR | 100632922 | 9/2006 |
| KR | 100747212 | 8/2007 |

* cited by examiner

*Primary Examiner* — Lincoln Donovan
*Assistant Examiner* — Terry L Englund
(74) *Attorney, Agent, or Firm* — Volentine & Whitt, P.L.L.C.

(57) ABSTRACT

A negative supply voltage generating circuit includes a pulse generating circuit and a charge pump. The pulse generating circuit generates a first pulse signal and a second pulse signal in response to a clock signal. The first and second pulse signals have pulse widths different from each other. The charge pump generates a negative supply voltage by performing a charge pumping operation in response to the first and second pulse signals, and has a time interval between a switch-on time duration for charging a flying capacitor and a switch-on time duration for transmitting charges to an output capacitor.

16 Claims, 9 Drawing Sheets

NEGATIVE SUPPLY VOLTAGE GENERATING CIRCUIT AND SEMICONDUCTOR INTEGRATED CIRCUIT HAVING THE SAME

PRIORITY CLAIM

A claim of priority is made to Korean Patent Application No. 10-2008-0078894, filed on Aug. 12, 2008, in the Korean Intellectual Property Office, the subject matter of which is hereby incorporated by reference.

SUMMARY

Various embodiments relate to semiconductor integrated circuits, and more particularly, to negative supply voltage generating circuits for generating negative supply voltages used in semiconductor integrated circuits.

Negative supply voltages are used for biasing portions of circuits in semiconductor memory devices, such as Dynamic Random Access Memory (DRAM). For example, a back bias voltage, which is typically a negative supply voltage, is applied to a bulk (e.g., P-Well) of a Metal Oxide Semiconductor (MOS) transistor included in a memory cell array of DRAM in order to increase a data retention time at a bit line by reducing leakage current.

Conventional negative supply voltage generating circuits have inefficient voltage conversion. This is because discharge paths are formed from an output node to ground, while an output capacitor is charged with the negative supply voltage.

Accordingly, illustrative embodiments described herein provide a negative supply voltage generating circuit capable of increasing efficiency of voltage conversion, for example, and a semiconductor integrated circuit that includes the negative supply voltage generating circuit.

In illustrative embodiments, a negative supply voltage generating circuit includes a pulse generating circuit and a charge pump. The pulse generating circuit generates a first pulse signal and a second pulse signal in response to a clock signal. The first and second pulse signals have pulse widths different from each other, and there is a non-overlap period between the first pulse signal and the second pulse signal. The charge pump generates a negative supply voltage by performing a charge pumping operation in response to the first and second pulse signals, and has a time interval between a switch-on time duration for charging a flying capacitor and a switch-on time duration for transmitting charges to an output capacitor.

The first and second pulse signals may have pulse trains of multiple pulses formed by a first logic level and a second logic level. Each pulse of the second pulse signal may transition from the first logic level to the second logic level after each pulse of the first pulse signal transitions from the first logic level to the second logic level. Also, each pulse of the second pulse signal may transition from the second logic level to the first logic level before the each pulse of the first pulse signal transitions from the second logic level to the first logic level.

The negative supply voltage generating circuit may further include an output capacitor that is coupled to an output node, where the negative supply voltage corresponds to a voltage at the output node.

The pulse generating circuit may include an OR gate and an AND gate. The OR gate performs an OR operation on the clock signal and the second pulse signal to generate the first pulse signal. The AND gate performs an AND operation on the clock signal and the first pulse signal to generate the second pulse signal.

The negative supply voltage generating circuit may perform the charge pumping operation further in response to the clock signal.

The charge pump may charge the flying capacitor in response to the clock signal and the first pulse signal, may charge a level shifting capacitor in response to the clock signal and the second pulse signal, and may control a charge transmission circuit.

The charge pump may include an inverter, a flying capacitor, a level shifting capacitor, a flying capacitor charging circuit, a level shifting capacitor charging circuit and a charge transmission circuit. The inverter receives the first pulse signal through a first input terminal, invert the first pulse signal and generate a third pulse signal. The flying capacitor is coupled between an output terminal of the inverter and a first node. The level shifting capacitor is coupled between a second input terminal and a second node. The flying capacitor charging circuit charges the flying capacitor in response to the clock signal and the third pulse signal. The level shifting capacitor charging circuit charges the level shifting capacitor in response to the clock signal and the second pulse signal. The charge transmission circuit transmits a voltage signal at the first node to an output node in response to a voltage signal at the second node.

The charge transmission circuit may include a MOS transistor that performs a switching operation in response to the voltage signal at the second node to electrically connect the first node with the output node. The charge transmission circuit may further include a diode coupled in parallel to the MOS transistor. The diode may be a parasitic bulk transistor formed between a source region and a drain region of the MOS transistor.

Each of the flying capacitor charging circuit and the level shifting capacitor charging circuit may have a latch configuration, respectively.

The flying capacitor charging circuit may include an inverter, a delay circuit, a NAND gate, a capacitor and a latch circuit. The inverter inverts the clock signal to generate an inverted clock signal. The delay circuit delays the third pulse signal to generate a gate input signal. The NAND gate performs a NAND operation on the inverted clock signal and the gate input signal. The capacitor includes a first terminal coupled an output terminal of the NAND gate and a second terminal coupled to a third node. The latch circuit charges the flying capacitor in response to a voltage signal at the first node and a voltage signal at the third node.

The flying capacitor charging circuit may electrically connect the first node to a ground voltage while the flying capacitor is charged by a source voltage.

The level shifting capacitor charging circuit may include a delay circuit, a NAND gate, a capacitor and a latch circuit. The delay circuit delays the second pulse signal to generate a gate input signal. The NAND gate performs a NAND operation on the clock signal and the gate input signal. The capacitor includes a first terminal coupled an output terminal of the NAND gate and a second terminal coupled to a third node. The latch circuit charges the level shifting capacitor in response to the voltage signal at the second node and a voltage signal at the third node.

The level shifting capacitor charging circuit may electrically connect the second node to a ground voltage level while the level shifting capacitor is charged by the source voltage.

The charge pump may include an inverter, a flying capacitor, a level shifting capacitor, a flying capacitor charging circuit, a level shifting capacitor charging circuit and a charge transmission circuit. The inverter receives the first pulse signal through a first input terminal, inverts the first pulse signal and generates a third pulse signal. The flying capacitor is coupled between an output terminal of the inverter and a first node. The level shifting capacitor is coupled between a second input terminal and a second node. The flying capacitor charging circuit charges the flying capacitor in response to the first pulse signal. The level shifting capacitor charging circuit charges the level shifting capacitor in response to the second pulse signal. The charge transmission circuit transmission a voltage signal at the first node to an output node in response to a voltage signal at the second node.

The flying capacitor charging circuit may include a capacitor and a latch circuit. The capacitor includes a first terminal coupled to the first input terminal and a second terminal coupled to a third node. The latch circuit charges the flying capacitor in response to the voltage signal at the first node and a voltage signal at the third node.

The level shifting capacitor charging circuit may include an inverter, a capacitor and a latch circuit. The inverter receives the second pulse signal through the second input terminal and inverts the second pulse signal. The capacitor includes a first terminal coupled an output terminal of the inverter and a second terminal coupled to a third node. The latch circuit charges the level shifting capacitor in response to the voltage signal at the second node and a voltage signal at the third node.

In illustrative embodiments, a negative supply voltage generating circuit includes a pulse generating circuit and a charge pump circuit. The pulse generating circuit generates a first pulse signal and a second pulse signal that have pulse trains of multiple pulses in response to a clock signal. The pulse trains of the first and second pulse signals are formed by a first logic level and a second logic level, and each pulse of the second pulse signal transitions from the first logic level to the second logic level later than each pulse of the first pulse signal and transitions from the second logic level to the first logic level faster than the each pulse of the first pulse signal. The charge pump circuit performs a charge pumping operation in response to the first and second pulse signals, and generates a negative supply voltage.

In illustrative embodiments, a semiconductor includes a circuit and a negative supply voltage generating circuit. The circuit receives a negative supply voltage and operates in response to the negative supply voltage. The negative supply voltage generating circuit generates the negative supply voltage, and includes a pulse generating circuit and a charge pump. The pulse generating circuit generates a first pulse signal and a second pulse signal in response to a clock signal. The first and second pulse signals have pulse widths different from each other, and there is a non-overlap period between the first pulse signal and the second pulse signal. The charge pump generates the negative supply voltage by performing a charge pumping operation in response to the first and second pulse signals, and has a time interval between a switch-on time duration for charging a flying capacitor and a switch-on time duration for transmitting charges to an output capacitor.

The semiconductor integrated circuit may be a semiconductor memory device that includes a memory cell array using the negative supply voltage as a back bias voltage.

Accordingly, in a negative supply voltage generating circuit and a semiconductor integrated circuit according to various illustrative embodiments, a switch for charging the flying capacitor and a switch for transmitting charges to the output capacitor are not on simultaneously. Thus, discharge paths are not formed from the output node to ground while the output capacitor is charged with the negative supply voltage, and thus the negative supply voltage generating circuit has high voltage conversion efficiency.

DETAILED DESCRIPTION OF THE EMBODIMENTS

Figure 1:
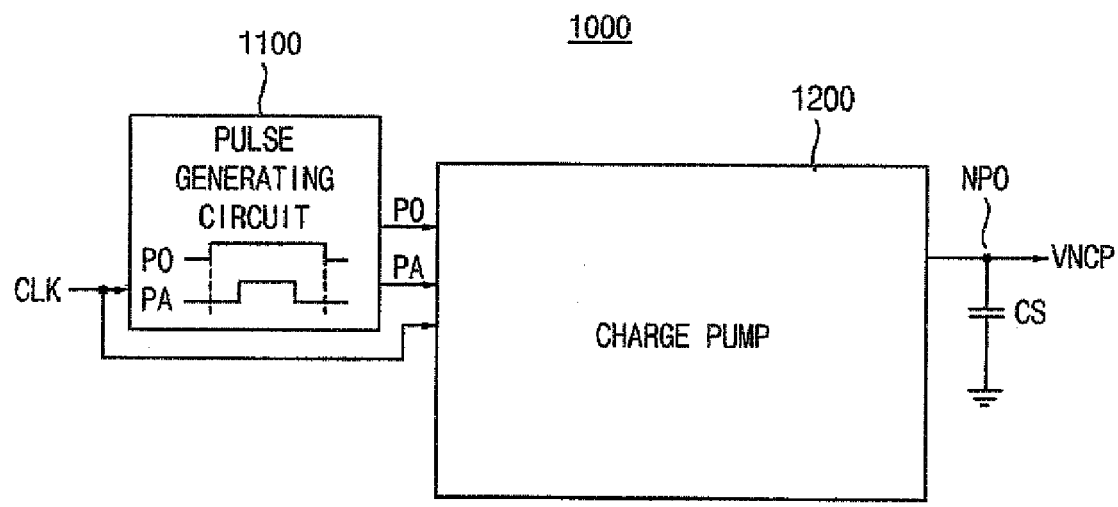
FIG. 1 is a block diagram illustrating a negative supply voltage generating circuit, according to an illustrative embodiment.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

It will be understood that, although the terms first, second, etc., may be used to describe various elements, these elements are not limited by these terms. Rather, these terms are used to distinguish one element from another. For example, a first element could be termed a second element, and similarly, a second element could be termed a first element, without departing from the scope of the present teachings.

It will be understood that when an element is referred to as being "connected" or "coupled" to another element, it can be directly connected or coupled to the other element or intervening elements may be present. In contrast, when an element is referred to as being "directly connected" or "directly coupled" to another element there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, and/or components. As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a negative supply voltage generating circuit 1000, according to an illustrative embodiment.

Referring to FIG. 1, the negative supply voltage generating circuit 1000 includes a pulse generating circuit 1100 and a charge pump 1200. The pulse generating circuit 1100 generates a first pulse signal PO and a second pulse signal PA in response to a clock signal CLK. The first and second pulse signals PO and PA have pulse widths different from each other. The charge pump 1200 generates a negative supply voltage VNCP by performing a charge pumping operation in response to the clock signal CLK, the first pulse signal PO and the second pulse signal PA. The charge pump 1200 has a predetermined time interval between a switch-on time duration for charging a flying capacitor (not shown in FIG. 1) and a switch-on time duration for transmitting charges to an output capacitor CS.

Figure 2:
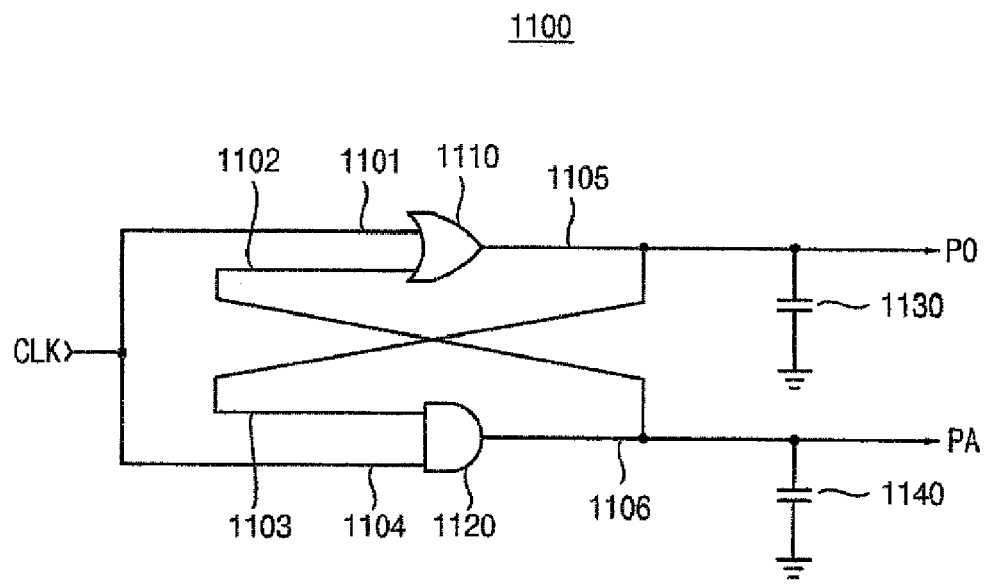
FIG. 2 is a circuit diagram illustrating an example of a pulse generating circuit included in the negative supply voltage generating circuit of FIG. 1, according to an illustrative embodiment.

Referring to FIG. 2, the pulse generating circuit 1100 includes an OR gate 1110 and an AND gate 1120. The OR gate 1110 performs an OR operation on the clock signal CLK and the second pulse signal PA received at inputs 1101 and 1102, respectively, to generate the first pulse signal PO at output 1105. The AND gate 1120 performs an AND operation on the clock signal CLK and the first pulse signal PO received at inputs 1104 and 1103, respectively, to generate the second pulse signal PA at output 1106. The pulse generating circuit 1100 of FIG. 2 may further include a first capacitor 1130 and a second capacitor 1140 to control a non-overlap period between a pulse of the first pulse signal PO and a corresponding pulse of the second pulse signal PA.

Referring to FIG. 2, the pulse generating circuit 1100 includes an OR gate 1110 and an AND gate 1120. The OR gate 1110 performs an OR operation on the clock signal CLK and the second pulse signal PA to generate the first pulse signal PO. The AND gate 1120 performs an AND operation on the clock signal CLK and the first pulse signal PO to generate the second pulse signal PA. The pulse generating circuit 1100 of FIG. 2 may further include a first capacitor 1130 and a second capacitor 1140 to control a non-overlap period between a pulse of the first pulse signal PO and a corresponding pulse of the second pulse signal PA.

Figure 3:
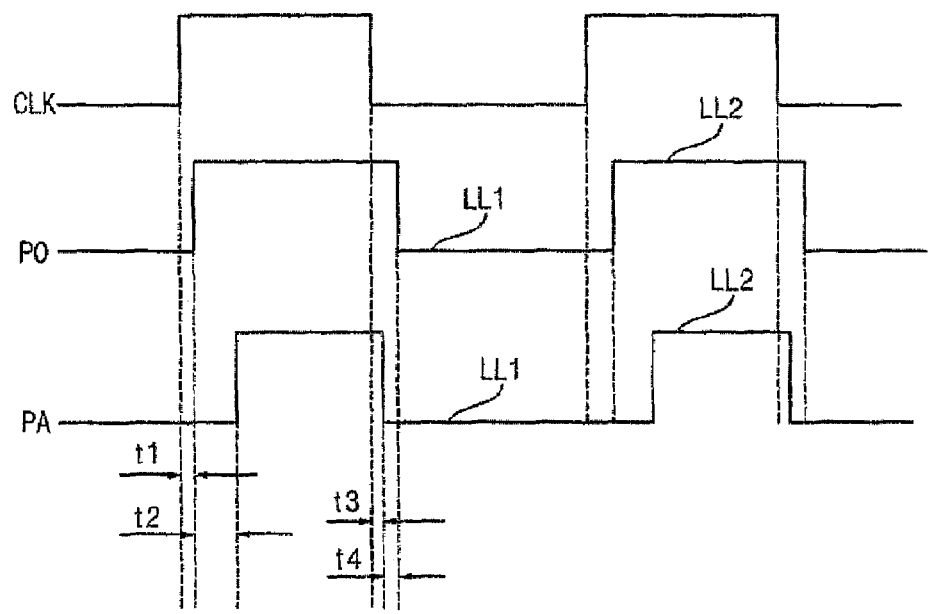
FIG. 3 is a timing diagram illustrating operation of the pulse generating circuit of FIG. 2, according to an illustrative embodiment.

FIG. 3 is a timing diagram illustrating operation of the pulse generating circuit 1100 of FIG. 2, according to an illustrative embodiment.

Referring to FIG. 3, the first and second pulse signals PO and PA have pulse trains of pulses formed by a first logic level LL1 and a second logic level LL2, respectively. Each pulse of the second pulse signal PA transitions from the first logic level LL1 to the second logic level LL2 later than each pulse of the first pulse signal PO, and transitions from the second logic level LL2 to the first logic level LL1 faster than the pulses of the first pulse signal PO.

A first delay time t1 exists between a rising edge of the clock signal CLK and a rising edge of the first pulse signal PO. A third delay time t3 exists between a falling edge of the clock signal CLK and a falling edge of the second pulse signal PA. A second delay time t2 exists between the rising edge of the first pulse signal PO and a rising edge of the second pulse signal PA. A fourth delay time t4 exists between a falling edge of the second pulse signal PA and the falling edge of the first pulse signal PO. Each pulse of the first and the second pulse signals PO and PA may be a duration corresponding to the second logic level LL2. In this case, the non-overlap period is the second delay time t2 and the fourth delay time t4 in FIG. 3.

As is shown in FIG. 3, the pulse of the second pulse signal PA is included within the pulse of the first pulse signal PO. Accordingly, a pulse width of the pulse of the second pulse signal PA is shorter than a pulse width of the pulse of the first pulse signal PO.

Figure 4:
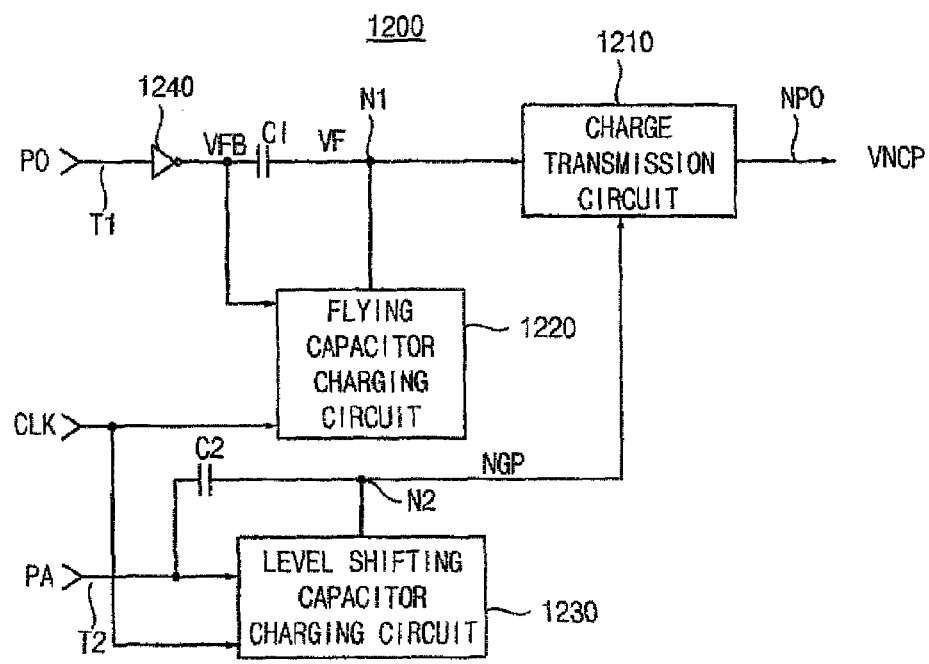
FIG. 4 is a block diagram illustrating a charge pump included in the negative supply voltage generating circuit of FIG. 1, according to an illustrative embodiment.

FIG. 4 is a block diagram illustrating the charge pump 1200 included in the negative supply voltage generating circuit 1000 of FIG. 1, according to an illustrative embodiment.

Referring to FIG. 4, the charge pump 1200 includes a flying capacitor C1, a level shifting capacitor C2, a charge transmission circuit 1210, a flying capacitor charging circuit 1220, a level shifting capacitor charging circuit 1230 and a first inverter 1240.

The first inverter 1240 receives the first pulse signal PO through a first input terminal T1, inverts the first pulse signal PO and generates a third pulse signal VFB. The flying capacitor C1 is coupled between an output terminal of the first inverter 1240 and a first node N1. The level shifting capacitor C2 is coupled between a second input terminal T2, through which the second pulse signal PA is provided, and a second node N2. The flying capacitor charging circuit 1220 charges the flying capacitor C1 in response to the clock signal CLK and the third pulse signal VFB. The level shifting capacitor charging circuit 1230 charges the level shifting capacitor C2 in response to the clock signal CLK and the second pulse signal PA. The charge transmission circuit 1210 transmits a voltage signal VF at the first node N1 to an output node NPO in response to a voltage signal NGP at the second node N2.

Figure 5:
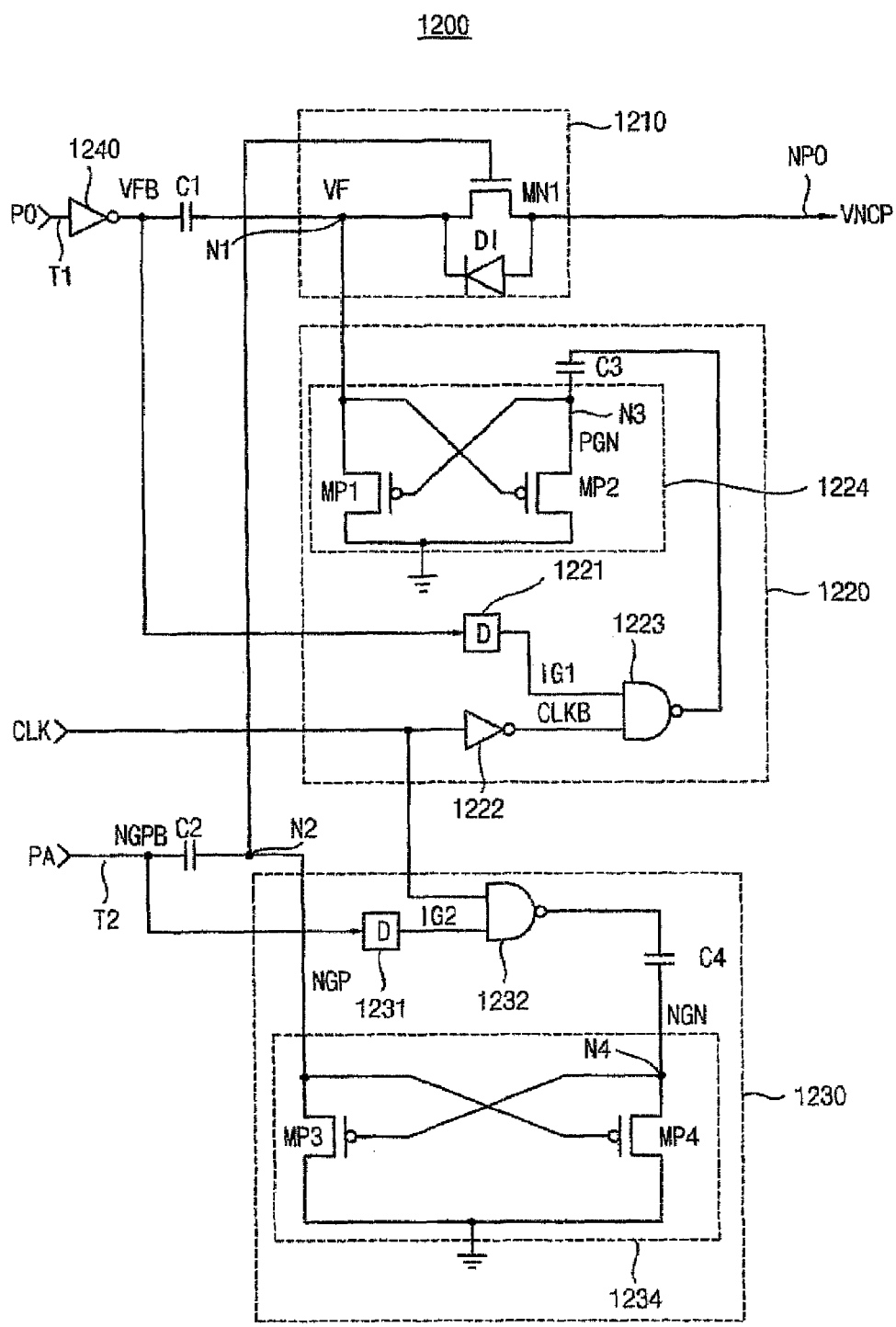
FIG. 5 is a detailed circuit diagram illustrating an example of the charge pump of FIG. 4, according to an illustrative embodiment.

FIG. 5 is a circuit diagram illustrating an example of the charge pump 1200 of FIG. 4, according to an illustrative embodiment.

Referring to FIG. 5, the charge transmission circuit 1210 includes an N-type Metal Oxide Semiconductor (NMOS) transistor MN1 that performs a switching operation in response to the voltage signal NGP at the second node N2 to electrically connect the first node N1 with the output node NPO. The charge transmission circuit 1210 may further include a diode D1 coupled in parallel to the NMOS transistor MN1. For example, the diode D1 included in the charge transmission circuit 1210 may be a parasitic bulk transistor formed between a source region and a drain region of the NMOS transistor MN1. The diode D1 is formed between a drain terminal and a source terminal of the NMOS transistor MN1 based on the bulk of the NMOS transistor MN1, the drain of the NMOS transistor MN1 and the source of the NMOS transistor MN1.

The flying capacitor charging circuit 1220 includes a second inverter 1222, a first delay circuit 1221, a first NAND gate 1223, a first capacitor C3 and a first latch circuit 1224.

The second inverter 1222 inverts the clock signal CLK to generate an inverted clock signal CLKB. The first delay circuit 1221 delays the third pulse signal VFB to generate a first gate input signal IG1. The first NAND gate 1223 performs a NAND operation on the inverted clock signal CLKB and the first gate input signal IG1. The first capacitor C3 is coupled between an output terminal of the first NAND gate 1223 and a third node N3. The first latch circuit 1224 electrically connects the first node N1 to a ground voltage in response to a voltage signal VP at the first node N1 and a voltage signal PGN at the third node N3.

The first latch circuit 1224 includes a first P-type Metal Oxide Semiconductor (PMOS) transistor MP1 and a second PMOS transistor MP2. The first PMOS transistor MP1 has a first end (for example, a source) coupled to a ground voltage, a second end (for example, a drain) coupled to the first node N1 and a gate coupled to the third node N3. The second PMOS transistor MP2 has a first end (for example, a source) coupled to the ground voltage, a second end (for example, a drain) coupled to the third node N3 and a gate coupled to the first node N1.

The level shifting capacitor charging circuit 1230 includes a second delay circuit 1231, a second NAND gate 1232, a second capacitor C4 and a second latch circuit 1234.

The second delay circuit 1231 delays the second pulse signal PA to generate a second gate input signal IG2. The second NAND gate 1232 performs a NAND operation on the clock signal CLK and the second gate input signal IG2. The second capacitor C4 is coupled between an output terminal of the second NAND gate 1232 and a fourth node N4. The second latch circuit 1234 electrically connects to the second node N2 to the ground voltage in response to a voltage signal NGP at the second node N2 and a voltage signal NGN at the fourth node N4.

The second latch circuit 1234 includes a third PMOS transistor MP3 and a fourth PMOS transistor MP4. The third PMOS transistor MP3 has a first end (for example, a source) coupled to the ground voltage, a second end (for example, a drain) coupled to the second node N2 and a gate coupled to the fourth node N4. The fourth PMOS transistor MP4 has a first end (for example, a source) coupled to the ground voltage, a second end (for example, a drain) coupled to the fourth node N4 and a gate coupled to the second node N2.

Figure 6:
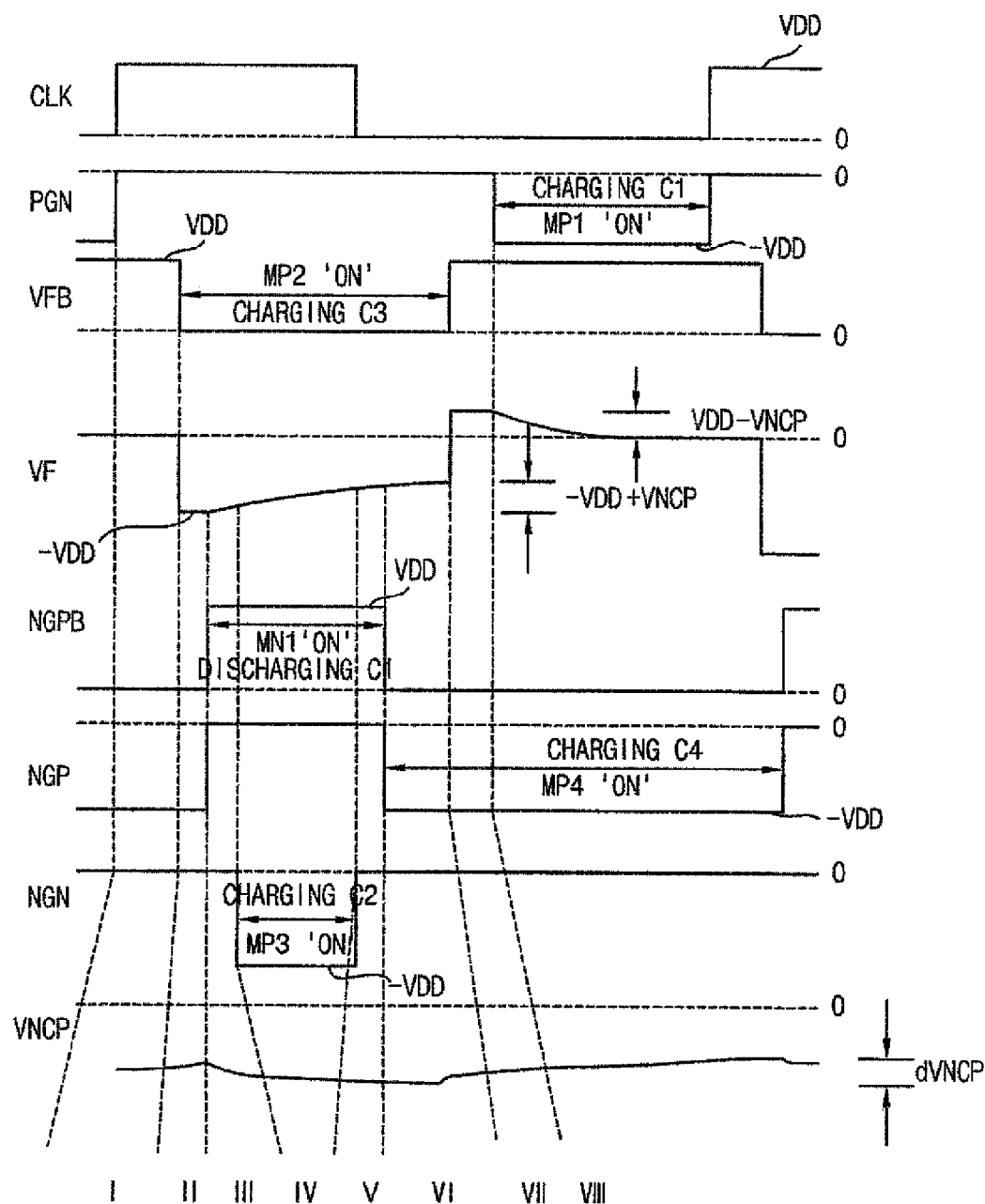
FIG. 6 is a timing diagram illustrating operation of the negative supply voltage generating circuit of FIG. 1, according to an illustrative embodiment.

FIG. 6 is a timing diagram illustrating an operation of the negative supply voltage generating circuit 1000 of FIG. 1. In FIG. 6, a voltage signal NGPB at the second terminal T2 in FIG. 5 is a voltage applied to the level shifting capacitor C2, and the same signal as the second pulse signal PA provided through the second input terminal T2.

Hereinafter, operation of the negative supply voltage generating circuit 1000 according to an illustrative embodiment is described with reference to FIGS. 1 through 6.

Referring to FIGS. 1 and 3, the negative supply voltage generating circuit 1000 generates, using the clock signal CLK, the first pulse signal PO and the second pulse signal PA, such that the pulse width of the second pulse signal PA is shorter than the pulse width of the first pulse signal PO. The negative supply voltage generating circuit 1000 generates the negative supply voltage VNCP by performing the charge pumping operation in response to the clock signal CLK, the first pulse signal PO and the second pulse signal PA. The negative supply voltage generating circuit 1000 has the predetermined time interval between the switch-on time duration for charging the flying capacitor and a switch-on time duration for transmitting charges to the output capacitor CS. The pulse generating circuit 1100 generates the first and second pulse signals PO and PA that have pulse widths different from each other. The charge pump 1200 performs the charge pumping operation using the clock signal CLK, the first pulse signal PO and the second pulse signal PA, and generates the negative supply voltage VNCP.

As described above, the first and second pulse signals PO and PA have pulse trains formed by the first logic level LL1 and the second logic level LL2. Each pulse of the second pulse signal PA transitions from the first logic level LL1 to the second logic level LL2 later than each pulse of the first pulse signal PO and transitions from the second logic level LL2 to the first logic level LL1 sooner than the each pulse of the first pulse signal PO.

Thus, the negative supply voltage generating circuit 1000 according to an illustrative embodiment has highly efficient voltage conversion, since the switch for charging the flying capacitor C1 and the switch for transmitting charges to the output capacitor CS are not turned on simultaneously.

Referring to FIG. 5, the first node N1 is charged with the ground voltage 0 V by the flying capacitor generating circuit 1220. The voltage signal VF at the first node N1 changes from the ground voltage 0 V to an inverted source voltage −VDD when the first pulse signal PO transitions from a low level 0 V to a high level VDD, that is, when the third pulse signal VFB transitions from the high level VDD to the low level 0 V. The voltage signal NGP at the second node N2 changes from the ground voltage 0 V to the source voltage VDD, and thus the charge transmission circuit 1210 is turned on. The charges are transmitted to the output node NPO through the NMOS transistor MN1 included in the charge transmission circuit 1210 and the negative charges are stored in the output capacitor CS (shown in FIG. 1) coupled to the output node NPO. When the first PMOS transistor MP1 is turned on, the first node N1 is electrically connected to the ground voltage 0 V in response to a voltage signal VF at the first node N1 and a voltage signal PGN at the third node N3.

In an initial operation of the negative supply voltage generating circuit 1000, for example, when the negative supply voltage VNCP is the ground voltage 0 V, the output capacitor CS is rapidly charged with the negative supply voltage VNCP, since the NMOS transistor MN1 and the diode D1 coupled in parallel to the NMOS transistor MN1 are turned on. When the negative supply voltage VNCP sufficiently falls below 0 V (e.g., −VDD +0.7 V), the diode D1 is turned off and the negative charges is transmitted from the first node N1 to the output node NPO through the NMOS transistor MN1.

The level shifting capacitor charging circuit 1230 charges the level shifting capacitor C2 and controls an operation timing for the charge transmission circuit 1210. The second node N2 is electrically connected to the ground voltage 0V in response to a voltage signal NGP at the second node N2 and a voltage signal NGN at the fourth node N4. The voltage signal NGP at the second node N2 changes from the ground voltage 0V to the inverted source voltage −VDD when the second pulse signal PA transitions from the high level VDD to the low level 0V. The NMOS transistor MN1 included in the charge transmission circuit 1210 is turned on when the voltage signal NGP at the second node N2 is the ground voltage 0V and is turned off when the voltage signal NGP at the second node N2 is the inverted source voltage −VDD.

Referring to FIGS. 4, 5 and 6, the voltage signal PGN at the third node N3 becomes the ground voltage 0V and the first PMOS transistor MP1 is turned off when the clock signal CLK changes from the low level 0V to the high level VDD (at a starting point of a first region I in FIG. 6). The third pulse signal VFB becomes the low level 0V and the voltage signal VF at the first node N1 changes from the ground voltage 0V to the inverted source voltage −VDD when the first pulse signal PO becomes the high level VDD (at a starting point of a second region II in FIG. 6). The voltage signal NGP at the second node N2 changes from the inverted source voltage −VDD to the ground voltage 0V when the second pulse signal PA becomes the high level VDD (at a starting point of a third region III in FIG. 6). Thus, the NMOS transistor MN1 is turned on, the charges in the flying capacitor C1 is transmitted to the output node NPO and the negative charges are stored in the output capacitor CS (shown in FIG. 1) coupled to the output node NPO. As shown in FIG. 6, an absolute value of the negative supply voltage VNCP increases.

The voltage signal NGN at the third node N3 changes from the ground voltage 0V to the inverted source voltage −VDD and the level shifting capacitor C2 is charged (at a starting point of a fourth region IV in FIG. 6). The level shifting capacitor C2 completes the charging operation before the NMOS transistor MN1 is turned off. The voltage signal NGP at the second node N2 changes from the ground voltage 0V to the inverted source voltage −VDD (at a starting point of a sixth region VI in FIG. 6). Thus, the NMOS transistor MN1 is turned off and the first node N1 is electrically disconnected from the output node NPO and thus the voltage signal VF at the first node N1 increases.

The voltage signal VF at the first node N1 increases by a difference between the source voltage VDD and the voltage VNCP at the output node NPO (from the third region III to a fifth region V in FIG. 6). Since voltage signal VF at the first node N1 still maintains the negative supply voltage VNCP, the flying capacitor C1 is charged with the source voltage VDD before the clock signal CLK transitions from the low level 0V to the high level VDD. As shown in FIG. 6, the voltage signal PGN at the third node N3 transitions from the ground voltage 0V to the inverted source voltage −VDD and the first PMOS transistor MP1 is turned on (at a starting point of a eighth region VIII in FIG. 6). Thus, the first node N1 is coupled to the ground voltage 0V and the flying capacitor C1 is charged with the source voltage VDD.

The first PMOS transistor MP1 and the NMOS transistor MN1 is sufficiently turned on and off because the flying capacitor charging circuit 1220 and the level shifting capacitor charging circuit 1230 have a latch configuration, respectively.

In a conventional negative supply voltage generating circuit, the switch for charging the flying capacitor and the switch for transmitting charges to the output capacitor may be simultaneously turned on, and thus discharge paths are formed from an output node to ground through which a leakage current may flow. Thus, the conventional negative supply voltage generating circuit has low voltage conversion efficiency.

In FIG. 6, the third pulse signal VFB is the source voltage VDD, the voltage signal NGPB at the second terminal T2 is the ground voltage 0V, the voltage signal NGN at the fourth node N4 is the ground voltage 0V and the voltage signal NGP at the second node N2 has the inverted source voltage −VDD in the first region I. The first pulse signal PO has an opposite phase to the third pulse signal VFB and the second pulse signal PA is the same signal as the voltage signal NGPB at the second terminal T2, and thus both the first and second pulse signals PO and PA have the low level 0V in the first region I. The voltage signal VF at the first node N1 maintains the ground voltage 0V.

The third pulse signal VFB is the ground voltage 0V, the voltage signal NGPB at the second terminal T2 is the ground voltage 0V, the voltage signal NGN at the fourth node N4 is the ground voltage 0V and the voltage signal NGP at the second node N2 has the inverted source voltage −VDD in the second region II. The first pulse signal PO has an opposite phase to the third pulse signal VFB and the second pulse signal PA is the same signal as the voltage signal NGPB at the second terminal T2, and thus the first pulse signal PO has the high level VDD and the second pulse signal PA has the low level 0V in the second region II. The voltage signal VF at the first node N1 has the inverted source voltage −VDD. The second PMOS transistor MP2 is on and the first capacitor C3 is charged.

The third pulse signal VFB is the ground voltage 0V, the voltage signal NGPB at the second terminal T2 has the source voltage VDD, the voltage signal NGN at the fourth node N4 is the ground voltage 0V and the voltage signal NGP at the second node N2 is the ground voltage 0V in the third region III. The first pulse signal PO has an opposite phase to the third pulse signal VFB and the second pulse signal PA is the same signal as the voltage signal NGPB at the second terminal T2, and thus both the first and second pulse signals PO and PA have the high level VDD in the third region II. The NMOS transistor MN1 and the second PMOS transistor MP2 are on, the voltage signal VF at the first node N1 starts to increase from the inverted source voltage −VDD. Also, the flying capacitor C1 is discharged in the third region III.

The third pulse signal VFB is the ground voltage 0V, the voltage signal NGPB at the second terminal T2 has the source voltage VDD, the voltage signal NGN at the fourth node N4 has the inverted source voltage −VDD level and the voltage signal NGP at the second node N2 is the ground voltage 0V in the fourth region IV. The first pulse signal PO has an opposite phase to the third pulse signal VFB and the second pulse signal PA is the same signal as the voltage signal NGPB at the second terminal T2, and thus both the first and second pulse signals PO and PA have the high level VDD in the fourth region IV. The NMOS transistor MN1, the second PMOS transistor MP2 and the third PMOS transistor MP3 are on. The voltage signal VF at the first node N1 is still increasing. The level shifting capacitor C2 is charged and the flying capacitor C1 is discharged in the fourth region IV.

The third pulse signal VFB is the ground voltage 0V, the voltage signal NGPB at the second terminal T2 has the source voltage VDD level, the voltage signal NGN at the fourth node N4 is the ground voltage 0V and the voltage signal NGP at the second node N2 is the ground voltage 0V in the fifth region V. The first pulse signal PO has an opposite phase to the third pulse signal VFB and the second pulse signal PA is the same signal as the voltage signal NGPB at the second terminal T2, and thus both the first and second pulse signals PO and PA have the high level VDD in the fifth region V. The NMOS transistor MN1 and the second PMOS transistor MP2 are on and the third PMOS transistor MP3 are off. The voltage signal VF at the first node N1 increases. Also, the flying capacitor C1 is discharged in the fifth region V.

The third pulse signal VFB is the ground voltage 0V, the voltage signal NGPB at the second terminal T2 is the ground voltage 0V, the voltage signal NGN at the fourth node N4 is the ground voltage 0V and the voltage signal NGP at the second node N2 has the inverted source voltage −VDD in the sixth region VI. The first pulse signal PO has an opposite phase to the third pulse signal VFB and the second pulse signal PA is the same signal as the voltage signal NGPB at the second terminal T2, and thus the first pulse signal PO has the high level VDD and the second pulse signal PA has the low level 0V in the sixth region VI. The NMOS transistor MN1 and the third PMOS transistor MP3 are off and the second PMOS transistor MP2 is on. Also, the fourth PMOS transistor MP4 is on and thus the second capacitor C4 is charged. The voltage signal VF at the first node N1 has a constant in the sixth region VI.

The third pulse signal VFB has the source voltage VDD, the voltage signal NGPB at the second terminal T2 is the ground voltage 0V, the voltage signal NGN at the fourth node N4 is the ground voltage 0V and the voltage signal NGP at the second node N2 has the inverted source voltage −VDD level in a seventh region VII. The first pulse signal PO has an opposite phase to the third pulse signal VFB and the second pulse signal PA is the same signal as the voltage signal NGPB at the second terminal T2, and thus both the first and second pulse signals PO and PA have the low level 0V in the seventh region VII. The NMOS transistor MN1, the second PMOS transistor MP2 and the third PMOS transistor MP3 are off. Also, the fourth PMOS transistor MP4 is on and thus the second capacitor C4 is charged. The voltage signal VF at the first node N1 transitions to a voltage VDD-VNCP.

The third pulse signal VFB has the source voltage VDD, the voltage signal NGPB at the second terminal T2 is the ground voltage 0V, the voltage signal NGN at the fourth node N4 is the ground voltage 0V and the voltage signal NGP at the second node N2 has the inverted source voltage −VDD level in the eighth region VIII. The first pulse signal PO has an opposite phase to the third pulse signal VFB and the second pulse signal PA is the same signal as the voltage signal NGPB at the second terminal T2, and thus the first pulse signal PO has the low level 0V and the second pulse signal PA has the high level VDD in the eighth region VIII. The NMOS transistor MN1, the second PMOS transistor MP2 and the third PMOS transistor MP3 are off. Also, the fourth PMOS transistor MP4 is on and thus the second capacitor C4 is charged. The voltage signal VF at the first node N1 slowly decreases from the voltage VDD-VNCP to the ground voltage 0V.

The absolute value of the negative supply voltage VNCP decreases in the first and second regions I and II, increases from the third region III to the sixth region VI, and decreases again in the seventh and eighth regions VII and VIII. There is a gap dVNCP between a maximum value and a minimum value of the absolute value of the negative supply voltage VNCP.

Referring to FIG. 6, the switch for charging the flying capacitor C1 and the switch for transmitting charges to the output capacitor (CS in FIG. 1) are not on simultaneously in the negative supply voltage generating circuit 1000, according to an illustrative embodiment. Thus, discharge paths are not formed from the output node NPO to ground in the negative supply voltage generating circuit 1000, and the negative supply voltage generating circuit 1000 has high voltage conversion efficiency.

Figure 7:
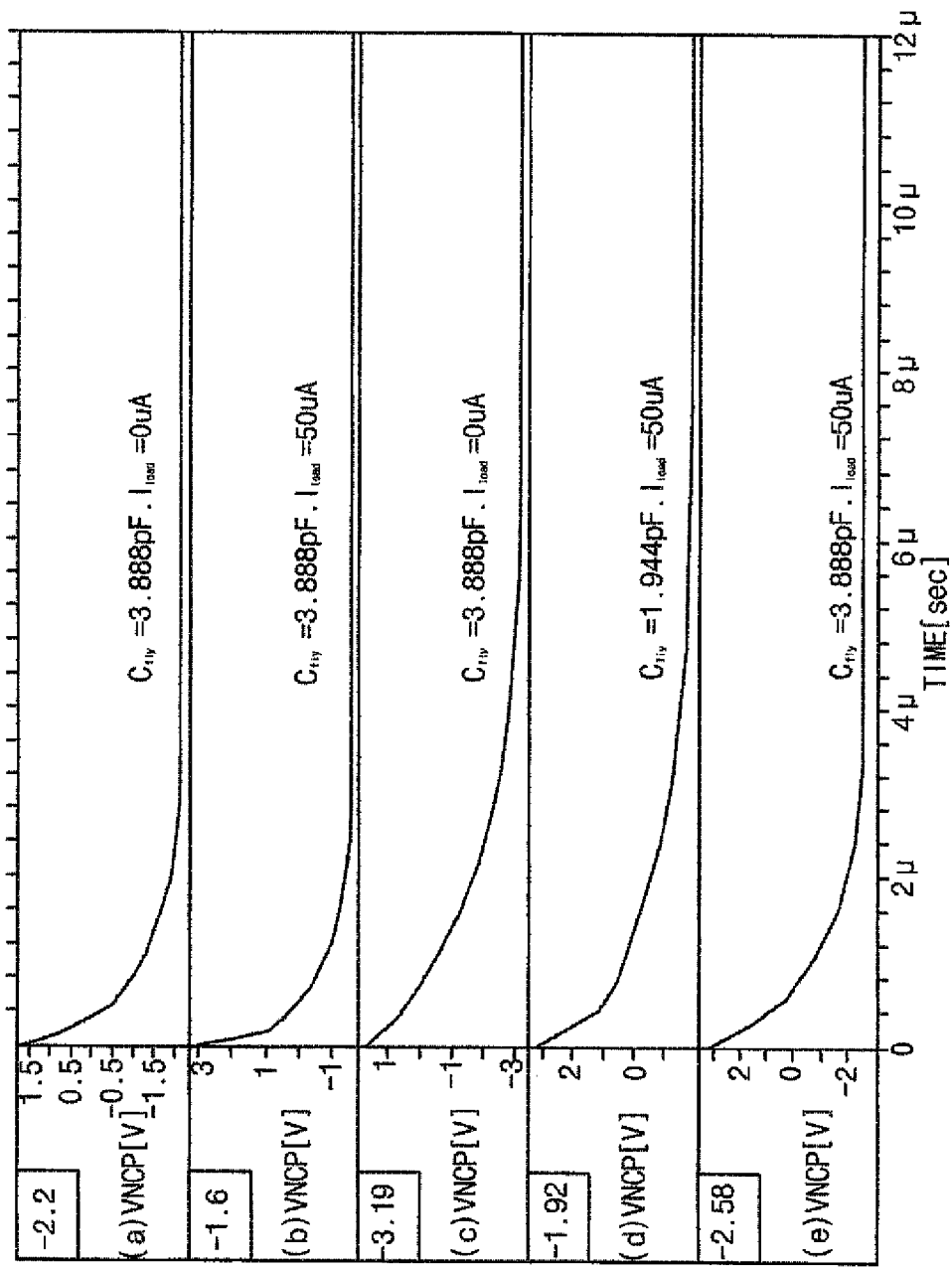
FIG. 7 is a diagram illustrating simulation results for comparing voltage conversion of a conventional negative supply voltage generating circuit with voltage conversion of the negative supply voltage generating circuit of FIG. 1, according to an illustrative embodiment.

FIG. 7 is a diagram illustrating simulation results for comparing voltage conversion of a conventional negative supply voltage generating circuit with a voltage conversion of the negative supply voltage generating circuit according to an illustrative embodiment.

In FIG. 7, graphs (a) and (b) indicate simulation results by the conventional negative supply voltage generating circuit and graphs (c), (d) and (e) indicate simulation results by the negative supply voltage generating circuit, as illustrated in FIG. 1, for example.

Referring to graphs (a) and (c) of FIG. 7, the negative supply voltage VNCP of the conventional negative supply voltage generating circuit is −2.2V and the negative supply voltage VNCP of the negative supply voltage generating circuit according to an illustrative embodiment is −3.19V when a capacitance Cfly of the flying capacitor C1 is 3.888 pF and a load current Iload is 0 uA. Also, referring to graphs (b) and (e), the negative supply voltage VNCP of the conventional negative supply voltage generating circuit is −1.6V and the negative supply voltage VNCP of the negative supply voltage generating circuit according to an illustrative embodiment is −2.58V when the capacitance Cfly of the flying capacitor C1 is 3.888 pF and the load current Iload is 50 uA. Accordingly, FIG. 7 shows that the efficiency of voltage conversion of the negative supply voltage generating circuit according to an illustrative embodiment is higher than the efficiency of voltage conversion of the conventional negative supply voltage generating circuit.

Figure 8:
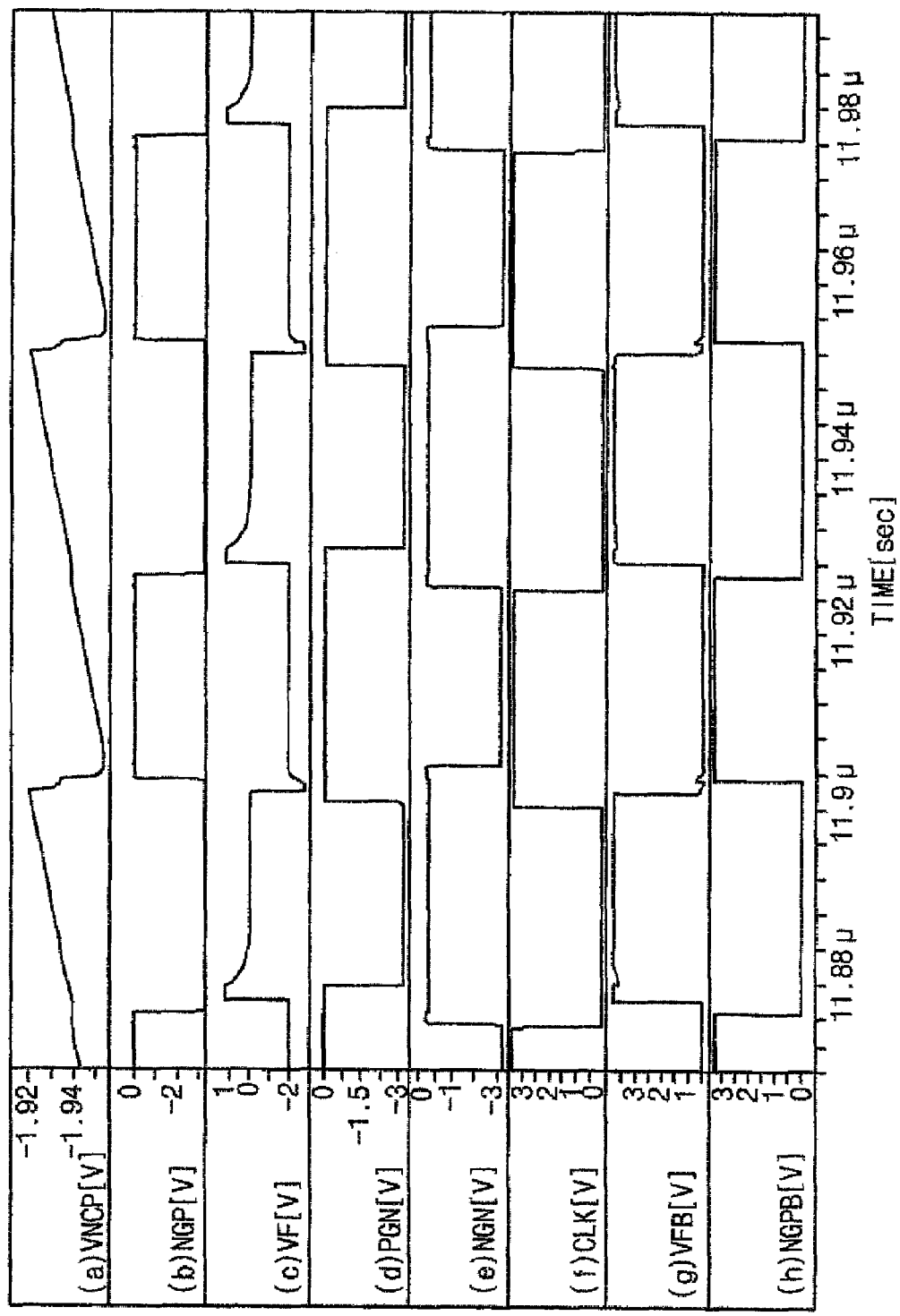
FIG. 8 is a simulation diagram illustrating operation of the negative supply voltage generating circuit of FIG. 1, according to an illustrative embodiment.

FIG. 8 is a simulation diagram illustrating operation of the negative supply voltage generating circuit of FIG. 1, according to an illustrative embodiment.

Referring to FIG. 8, the negative supply voltage VNCP changes between −1.92V and −1.95V. In FIG. 8, graphs (a) VNCP, (b) NGP, (c) VF, (d) PGN, (e) NGN, (f) CLK, (g) VFB and (h) NGPB indicate a voltage waveform at each node that is marked on the charge pump 1200 as illustrated in FIG. 5, respectively. The representative negative supply voltage generating circuit as illustrated in FIG. 1 has normal waveforms and good operational features at each node.

In FIGS. 7 and 8, the source voltage VDD is 3.3V, a load capacitance Cload is 65.6 pF and a frequency of the clock signal fCLK is 20 MHz in simulation conditions.

Figure 9:
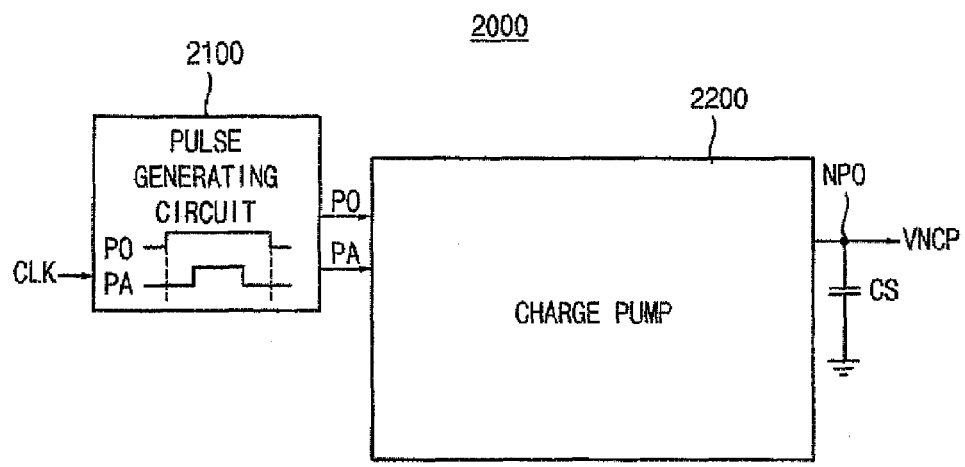
FIG. 9 is a block diagram illustrating a negative supply voltage generating circuit according to another illustrative embodiment.

FIG. 9 is a block diagram illustrating a negative supply voltage generating circuit according to another illustrative embodiment.

Referring to FIG. 9, the negative supply voltage generating circuit 2000 includes a pulse generating circuit 2100 and a charge pump 2200. The pulse generating circuit 2100 generates a first pulse signal PO and a second pulse signal PA in response to a clock signal CLK. The first and second pulse signals PO and PA have pulse widths different from each other. The charge pump 2200 generates a negative supply voltage VNCP by performing a charge pumping operation in response to the first pulse signal PO and the second pulse signal PA. The charge pump 2200 has a predetermined time interval between a switch-on time duration for charging a flying capacitor (not shown in FIG. 9) and a switch-on time duration for transmitting charges to an output capacitor CS.

As described below, in the negative supply voltage generating circuit 2000 of FIG. 9, the charge pump 2200 charges the flying capacitor and a level shifting capacitor using the first and second signals PO and PA, without using the clock signal CLK.

The pulse generating circuit 2100 may have the same configuration as the pulse generating circuit 1100, as illustrated in FIG. 2, for example. The pulse generating circuit 2100 generates the first pulse signal PO and the second pulse signal PA such that the pulse width of the second pulse signal PA is different from the pulse width of the first pulse signal PO. As shown in FIG. 3, for example, the pulse of the second pulse signal PA is included in the pulse of the first pulse signal PO. Accordingly, a pulse width of the pulse of the second pulse signal PA is shorter than a pulse width of the pulse of the first pulse signal PO.

Figure 10:
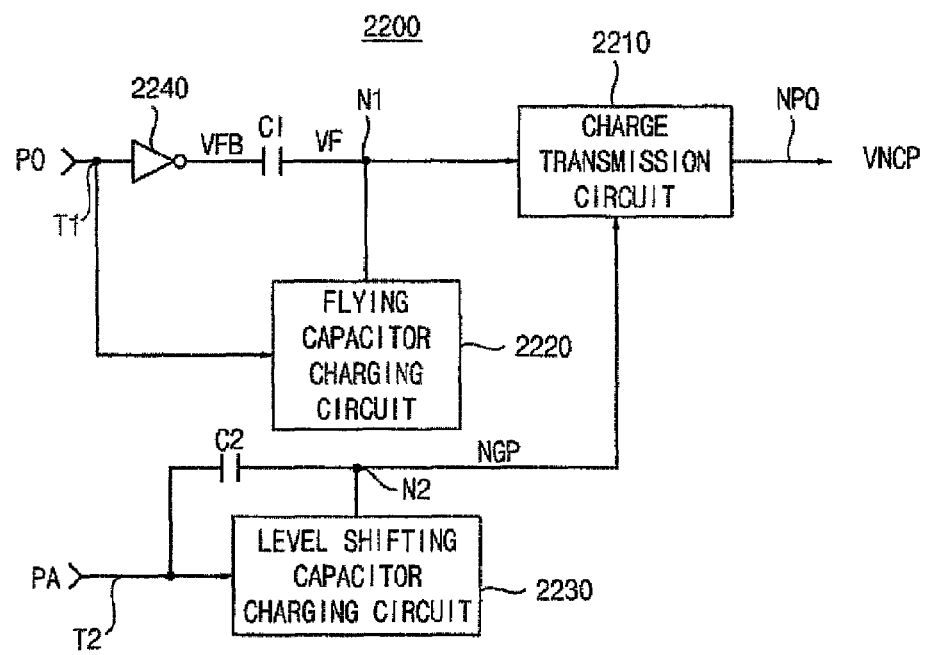
FIG. 10 is a block diagram illustrating a charge pump included in the negative supply voltage generating circuit of FIG. 9, according to an illustrative embodiment.

FIG. 10 is a block diagram illustrating a charge pump 2200 included in the negative supply voltage generating circuit 2000 of FIG. 9, according to an illustrative embodiment.

Referring to FIG. 10, the charge pump 2200 includes a flying capacitor C1, a level shifting capacitor C2, a charge transmission circuit 2210, a flying capacitor charging circuit 2220, a level shifting capacitor charging circuit 2230 and a first inverter 2240.

The first inverter 2240 receives the first pulse signal PO through a first input terminal T1, inverts the first pulse signal PO and generates a third pulse signal VFB. The flying capacitor C1 is coupled between an output terminal of the first inverter 2240 and a first node N1. The level shifting capacitor C2 is coupled between a second input terminal T2, through which the second pulse signal PA is provided, and a second node N2. The flying capacitor charging circuit 2220 charges the flying capacitor C1 in response to the first pulse signal PO. The level shifting capacitor charging circuit 2230 charges the level shifting capacitor C2 in response to the second pulse signal PA. The charge transmission circuit 2210 transmits a voltage signal VF at the first node N1 to an output node NPO in response to a voltage signal NGP at the second node N2.

Figure 11:
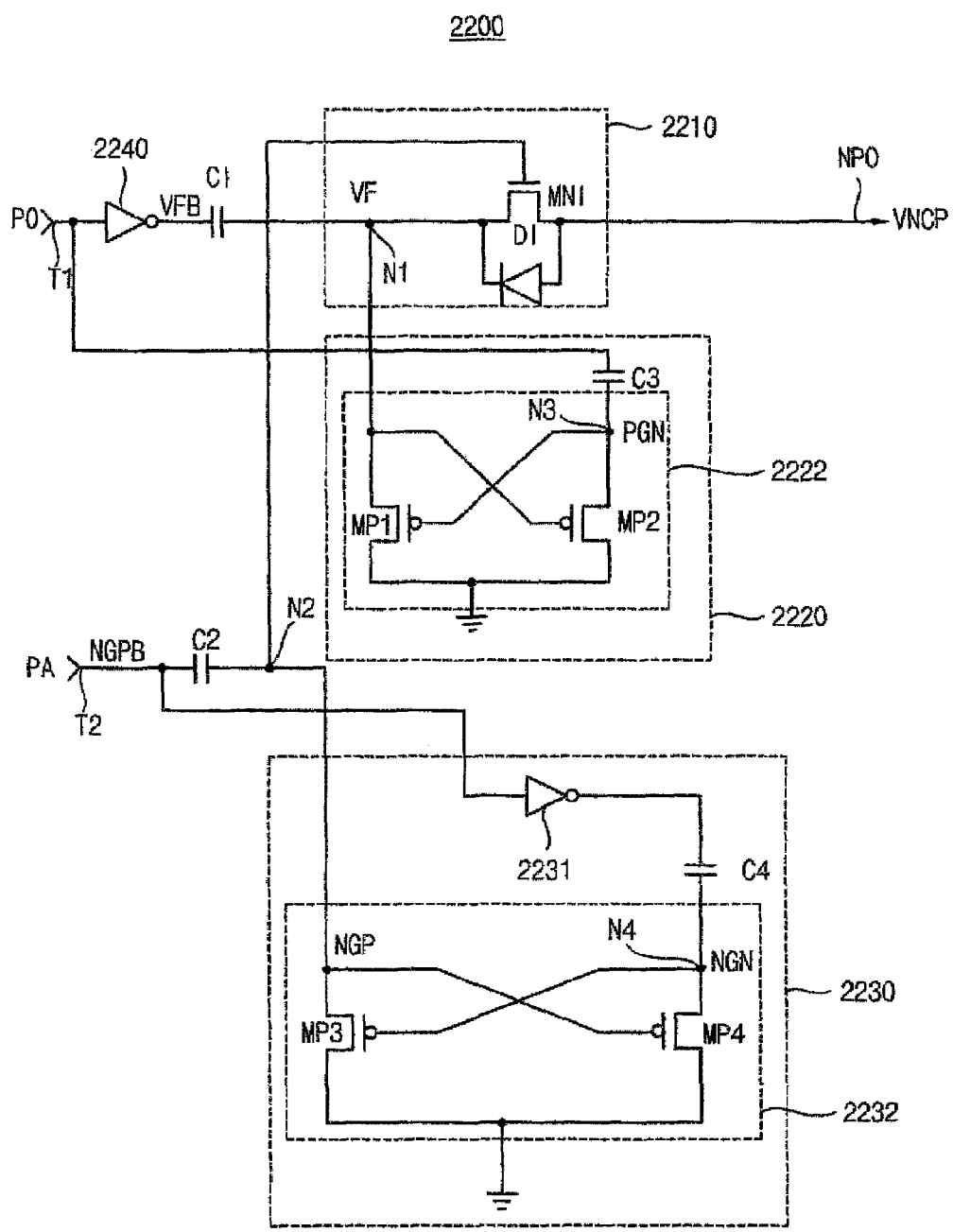
FIG. 11 is a detailed circuit diagram illustrating an example of the charge pump of FIG. 10, according to an illustrative embodiment.

FIG. 11 is a detailed circuit diagram illustrating an example of the charge pump 2200 of FIG. 10, according to an illustrative embodiment.

Referring to FIG. 11, the charge transmission circuit 2210 includes an NMOS transistor MN1 that performs a switching operation in response to the voltage signal NGP at the second node N2 to electrically connect the first node N1 with the output node NPO. The charge transmission circuit 2210 may further include a diode D1 coupled in parallel to the NMOS transistor MN1. For example, the diode D1 included in the charge transmission circuit 2210 may be a parasitic bulk transistor formed between a source region and a drain region of the NMOS transistor MN1. The diode D1 is formed between a drain terminal and a source terminal of the NMOS transistor MN1 based on the bulk of the NMOS transistor MN1, the drain of the NMOS transistor MN1 and the source of the NMOS transistor MN1.

The flying capacitor charging circuit 2220 includes a first capacitor C3 and a first latch circuit 2222. The first capacitor C3 is coupled between the first input terminal T1 and a third node N3. The first latch circuit 2222 charges the flying capacitor C1 in response to a voltage signal VF at the first node N1 and a voltage signal PGN at the third node N3.

The first latch circuit 2222 includes a first PMOS transistor MP1 and a second PMOS transistor MP2. The first PMOS transistor MP1 has a first end (for example, a source) coupled to a ground voltage, a second end (for example, a drain) coupled to the first node N1 and a gate coupled to the third node N3. The second PMOS transistor MP2 has a first endeavor example, a source) coupled to the ground voltage, a second end (for example, a drain) coupled to the third node N3 and a gate coupled to the first node N1.

The level shifting capacitor charging circuit 2230 includes a second inverter 2231, a second capacitor C4 and a second latch circuit 2232. The second inverter 2231 receives the second pulse signal PA through the second input terminal T2 to invert the second pulse signal PA. The second capacitor C4 is coupled between an output terminal of the second inverter 2231 and a fourth node N4. The second latch circuit 2232 charges the level shifting capacitor C2 in response to a voltage signal NGP at the second node N2 and a voltage signal NGN at the fourth node N4.

The second latch circuit 2232 includes a third PMOS transistor MP3 and a fourth PMOS transistor MP4. The third PMOS transistor MP3 has a first end (for example, a source) coupled to the ground voltage, a second end (for example, a drain) coupled to the second node N2 and a gate coupled to the fourth node N4. The fourth PMOS transistor MP4 has a first end (for example, a source) coupled to the ground voltage, a second end (for example, a drain) coupled to the fourth node N4 and a gate coupled to the second node N2.

As illustrated in FIG. 9 through FIG. 11, the negative supply voltage generating circuit 2000, according to an illustrative embodiment, generates the first pulse signal PO and the second pulse signal PA such that the pulse width of the second pulse signal PA is different from the pulse width of the first pulse signal PO. As described above, the pulse of the second pulse signal PA is included in the pulse of the first pulse signal PO. Thus, the negative supply voltage generating circuit 2000 as illustrated in FIG. 9 generates waveforms as illustrated in FIG. 6, for example.

There is the predetermined time interval between the NMOS transistor MN1 on time duration and the first PMOS transistor MP1 on time duration. Thus, discharge paths are not formed from the output node NPO to the ground in the negative supply voltage generating circuit 2000, according to the illustrative embodiment as illustrated in FIG. 9. The negative supply voltage generating circuit 2000 thus has high voltage conversion efficiency.

Since the negative supply voltage generating circuit 2000 of FIG. 9 similarly to the negative supply voltage generating circuit 1000, according to the illustrative embodiment as illustrated in FIG. 1, further description will not repeated.

Figure 12:
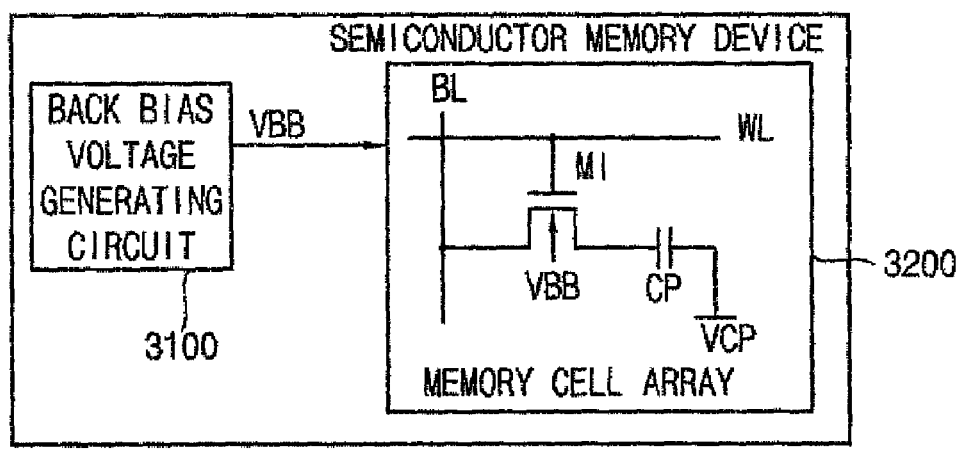
FIG. 12 is a block diagram illustrating a semiconductor memory device that receives a negative supply voltage from a negative supply voltage generating circuit, according to an illustrative embodiment.

FIG. 12 is a block diagram illustrating a semiconductor memory device 3000 that receives a negative supply voltage from a negative supply voltage generating circuit, according to an illustrative embodiment.

Referring to FIG. 12, the semiconductor memory device 3000 includes a back bias voltage generating circuit 3100 and a memory cell array 3200. The back bias voltage generating circuit 3100 generates a back bias voltage VBB having a negative value. The memory cell array 3200 receives the back bias voltage VBB and uses the back bias voltage VBB for biasing on a bulk, or body, in a MOS transistor included in the memory cell array 3200.

The memory cell array 3200 includes multiple unit memory cells. However, for convenience of explanation, FIG. 12 illustrates a representative unit memory cell, including MOS transistor M1 and capacitor CP, electrically coupled to bit line BL and word line WL. The capacitor CP is biased by a cell plate voltage VCP, and the back bias voltage VBB is applied to the bulk in the MOS transistor M1.

A representative semiconductor memory device 3000 that receives the back bias voltage VBB and uses the back bias voltage VBB as a bias voltage in the memory cell array 3200 is illustrated in FIG. 12. However, the inventive concept may be applied to various semiconductor devices using the negative supply voltage, without departing from the scope of the present teachings.

As described above, various embodiments may be included in negative supply voltage generating circuits, semiconductor integrated circuits including the same, and more particularly, semiconductor memory devices that use negative supply voltages as back bias voltages.

While the present inventive concept has been described with reference to exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A negative supply voltage generating circuit comprising:
a pulse generating circuit configured to generate a first pulse signal and a second pulse signal in response to a clock signal, the first and second pulse signals having pulse widths different from each other, a non-overlap period existing between a pulse of the first pulse signal and a pulse of the second pulse signal; and
a charge pump configured to generate a negative supply voltage by performing a charge pumping operation in response to the first and second pulse signals, and configured to have a time interval between a switch-on time duration for charging a flying capacitor and a switch-on time duration for transmitting charges to an output capacitor, wherein the charge pumping operation is performed further in response to the clock signal.

2. The negative supply voltage generating circuit of claim 1, wherein the first and second pulse signals have corresponding pulse trains comprising a plurality of pulses formed by a first logic level and a second logic level, each pulse of the second pulse signal transitioning from the first logic level to the second logic level after each pulse of the first pulse signal transitions from the first logic level to the second logic level, and transitioning from the second logic level to the first logic level faster than the each pulse of the first pulse signal transitions from the second logic level to the first logic level.

3. The negative supply voltage generating circuit of claim 1, wherein the output capacitor is coupled to an output node, the negative supply voltage corresponding to a voltage at the output node.

4. The negative supply voltage generating circuit of claim 1, wherein the pulse generating circuit comprises:
an OR gate configured to perform an OR operation on the clock signal and the second pulse signal to generate the first pulse signal; and
an AND gate configured to perform an AND operation on the clock signal and the first pulse signal to generate the second pulse signal.

5. The negative supply voltage generating circuit of claim 1, wherein the charge pump is configured to charge the flying capacitor in response to the clock signal and the first pulse signal, to charge a level shifting capacitor in response to the clock signal and the second pulse signal, and to control a charge transmission circuit.

6. The negative supply voltage generating circuit of claim 1, wherein the charge pump comprises:
an inverter configured to receive the first pulse signal through a first input terminal, to invert the first pulse signal and to generate a third pulse signal;
the flying capacitor coupled between an output terminal of the inverter and a first node;
a level shifting capacitor coupled between a second input terminal and a second node;
a flying capacitor charging circuit configured to charge the flying capacitor in response to the clock signal and the third pulse signal;
a level shifting capacitor charging circuit configured to charge the level shifting capacitor in response to the clock signal and the second pulse signal; and
a charge transmission circuit configured to transmit a voltage signal at the first node to an output node in response to a voltage signal at the second node.

7. The negative supply voltage generating of claim 6, wherein the charge transmission circuit comprises:

a MOS transistor configured to perform a switching operation in response to the voltage signal at the second node to electrically connect the first node with the output node.

8. The negative supply voltage generating circuit of claim 7, wherein the charge transmission circuit further comprises:
a diode coupled in parallel to the MOS transistor.

9. The negative supply voltage generating circuit of claim 8, wherein the diode is a parasitic bulk transistor formed between a source region and a drain region of the MOS transistor.

10. The negative supply voltage generating circuit of claim 6, wherein each of the flying capacitor charging circuit and the level shifting capacitor charging circuit comprises a latch configuration, respectively.

11. The negative supply voltage generating circuit of claim 6, wherein the flying capacitor charging circuit comprises:
an inverter configured to invert the clock signal to generate an inverted clock signal;
a delay circuit configured to delay the third pulse signal to generate a gate input signal;
a NAND gate configured to perform a NAND operation on the inverted clock signal and the gate input signal;
a capacitor including a first terminal coupled to an output terminal of the NAND gate and a second terminal coupled to a third node; and
a latch circuit configured to charge the flying capacitor in response to the voltage signal at the first node and a voltage signal at the third node.

12. The negative supply voltage generating circuit of claim 6, wherein the flying capacitor charging circuit is configured to electrically connect the first node to a ground voltage while the flying capacitor is charged by a source voltage.

13. The negative supply voltage generating circuit of claim 6, wherein the level shifting capacitor charging circuit comprises:
a delay circuit configured to delay the second pulse signal to generate a gate input signal;
a NAND gate configured to perform a NAND operation on the clock signal and the gate input signal;
a capacitor including a first terminal coupled to an output terminal of the NAND gate and a second terminal coupled to a third node; and
a latch circuit configured to charge the level shifting capacitor in response to the voltage signal at the second node and a voltage signal at the third node.

14. A negative supply voltage generating circuit comprising:
a pulse generating circuit configured to generate a first pulse signal and a second pulse signal having pulse trains in response to a clock signal, the pulse trains of the first and second pulse signals being formed by a first logic level and a second logic level, each pulse in the pulse train of the second pulse signal transitioning from the first logic level to the second logic level later than each pulse in the pulse train of first pulse signal, and transitioning from the second logic level to the first logic level faster than the each pulse in the pulse train of the first pulse signal; and
a charge pump configured to perform a charge pumping operation in response to the first and second pulse signals and the clock signal, and configured to generate a negative supply voltage based on the charge pumping operation.

15. A semiconductor integrated circuit comprising:

a circuit configured to receive a negative supply voltage and to operate in response to the negative supply voltage; and a negative supply voltage generating circuit configured to generate the negative supply voltage, the negative supply voltage generating circuit comprising:

a pulse generating circuit configured to generate a first pulse signal and a second pulse signal in response to a clock signal, the first and second pulse signals having corresponding pulse widths different from each other, a non-overlap period existing between the first pulse signal and the second pulse signal; and a charge pump configured to generate the negative supply voltage by performing a charge pumping operation in response to the first and second pulse signals and the clock signal, and configured to have a time interval between a switch-on time duration for charging a flying capacitor and a switch-on time duration for transmitting charges to an output capacitor.

16. The semiconductor integrated circuit of claim 15, wherein the semiconductor integrated circuit is a semiconductor memory device including a memory cell array, the memory cell array using the negative supply voltage as a back bias voltage.

* * * * *